United States Patent Office 3,192,207
Patented June 29, 1965

---

3,192,207
AMINOALKYL ESTERS OF 4-CARBOXYALKYL-2-PYRROLIDINONES AND 4-CARBOXYALKYL-2-THIONPYRROLIDINONES
Carl D. Lunsford, Richmond, and Albert D. Cale, Jr., Bon Air, Va., assignors to A. H. Robins Company, Inc., Richmond, Va., a corporation of Virginia
No Drawing. Filed Mar. 11, 1963, Ser. No. 264,051
9 Claims. (Cl. 260—243)

The present invention relates to certain heterocyclic esters which may be referred to as aminoalkyl esters of 4-carboxyalkyl-2-pyrrolidinones and 4-carboxyalkyl-2-thionpyrrolidinones, and is more particularly concerned with amino-lower-alkyl esters of 4-carboxyalkyl-3,3-disubstituted-1-substituted-2-pyrrolidinones and 4-carboxyalkyl-3,3-disubstituted-1-substituted-2-thionpyrrolidinones, compositions thereof, and a method of making and using the same. The invention is especially concerned with such heterocyclic esters having the formula:

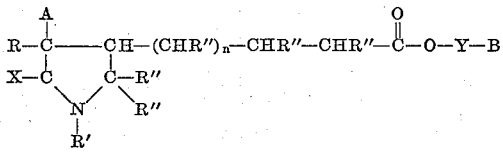

(I)

wherein

A is monocarbocyclic aryl,
X is sulfur or oxygen,
R is monocarbocyclic aryl, monocarbocyclic aralkyl, lower-alkyl, cycloalkyl-pyridyl, thienyl, or thenyl,
R' is lower-alkyl, lower-alkenyl, cycloalkyl, cycloalkenyl, or monocarbocyclic aralkyl,
R" is hydrogen or methyl, preferably a maximum of two R" being other than hydrogen,
n is zero or one,
Y is a lower-alkylene radical of straight or branched structure containing up to and including eight carbon atoms, wherein B is an amino radical, and wherein Y and B together can be an N-(lower-alkyl-substituted)-3-pyrrolidyl or -3 (or 4)-piperidyl radical which can also be lower-alkyl-substituted at one or more ring carbon atoms,
and acid-addition and quaternary ammonium salts thereof.

The compounds of the invention having the foregoing Formula I are generally characterized by important pharmacological activity, indicative of their use in counteracting certain physiological abnormalities in an animal body. The compounds are analeptics, hypotensives, or both. Certain compounds of the series are extremely potent and long-lasting analeptics, stimulating respiration and antagonizing central nervous system depression and exhibiting a particularly durable antagonism against barbiturate-induced depression or poisoning at dose levels considerably below that at which untoward side effects occur. While the degree and relative degree of their activities vary, all compounds tested exhibited analeptic activity although, as stated, because of the relative degree of analeptic versus hypotensive activity, some are preferred as hypotensives. The salts have special utility in that they are water-soluble and have an extended duration of activity.

The high order of activity of the active agents of the present invention, as evidenced by tests in lower animals, is indicative of utility based on their valuable activity in human beings as well as in lower animals. Clinical evaluation in human beings has not been completed, however. It will be clearly understood that the distribution and marketing of any compound or composition falling within the scope of the present invention for use in human beings will of course have to be predicated upon prior approval by governmental agencies, such as the U.S. Federal Food and Drug Administration, which are responsible for and authorized to pass judgment on such questions.

It is accordingly an object of the present invention to provide new and useful amino-lower-alkyl esters of 4-carboxyalkyl-2-pyrrolidinones and -2-thionpyrrolidinones, compositions thereof, and a method of making and using the same. Other objects of the invention will be apparent to one skilled in the art, and still other objects will become apparent hereinafter.

In the definition of symbols in the foregoing Formula I and where they appear elsewhere throughout this specification, the terms have the following significance.

By "monocarbocyclic aryl" radical is meant an aryl radical of the benzene series, having six ring carbon atoms, and this term includes the unsubstituted phenyl radical and phenyl radicals substituted by any radical or radicals which are not reactive or otherwise interfering under the conditions of reaction, such as nitro, lower-alkoxy, lower-alkylmercapto, lower-alkyl, di-lower-alkyl-amino, trifluoromethyl, halo, and the like. The substituted-phenyl radicals have preferably no more than one to three substituents such as those given above and, furthermore, these substituents can be in various available positions of the phenyl nucleus and, when more than one substituent is present, can be the same or different and can be in various position combinations relative to each other. The lower-alkyl, lower-alkoxy, lower-alkylmercapto, and di-lower-alkyl-amino ring substituents each have from one to four carbon atoms which can be arranged as straight or branched chains. A total of nine carbon atoms in all ring substituents is preferred maximum.

In the foregoing definition of R, certain cyclic radicals are referred to. When pyridyl is referred to, the 3- or 4-pyridyl radicals are included. When thienyl or thenyl radicals are referred to, these may be, for example, the 2- or 3-thienyl or 2- or 3-thenyl radicals.

The term "lower-alkyl" as used herein includes straight and branched chain radicals of up to eight carbon atoms inclusive and is exemplified by such groups as methyl, ethyl, propyl, isopropyl, tertiary butyl, amyl, isoamyl, hexyl, heptyl, octyl, and the like. The term "lower-alkenyl" includes straight and branched chain radicals of two up to eight carbon atoms inclusive and is exemplified by such groups as vinyl, allyl, methallyl, 4-pentenyl, 3-hexenyl, and 3-methyl-3-heptenyl. The term "cycloalkyl" as used herein includes primarily cyclic alkyl radicals containing three up to nine carbon atoms inclusive and encompasses such groups as cyclopropyl, cyclobutyl, cyclohexyl, cyclopentyl, methylcyclohexyl, propylcyclohexyl, ethylcyclopentyl, propylcyclopentyl, dimethylcyclohexyl, cycloheptyl, and cyclooctyl. The term "cycloalkenyl" as used herein includes cyclic alkenyl radicals containing up to nine carbon atoms inclusive and encompasses such usual radicals as 1- and 2-cyclohexenyl and 1- and 2-cyclopentenyl. Included in the term "aralkyl" are lower-alkyl substituted monocarbocyclic aryl groups such as benzyl, phenethyl, methylbenzyl, phenpropyl, and the like. As stated, the radicals R and R' in the foregoing Formula I are inclusive of such groups as lower-alkyl, cycloalkyl, cycloalkenyl, and aralkyl, and R' includes lower-alkenyl, which groups are all preferably although not necessarily radicals of a solely hydrocarbon nature.

When halogen is referred to herein, preferably but not necessarily a halogen of atomic weight in excess of nineteen but not greater than eighty is employed. Of the halogens, chlorine is preferred.

Among the suitable amino radicals included within the symbol B are primary, secondary and tertiary amino radicals, such as unsubstituted amino (—NH$_2$), lower-alkyl-amino; di-lower-alkyl-amino; lower-alkenyl-amino; di-lower-alkenyl-amino; phenylamino; (hydroxy-lower-alkyl)-amino; di-(hydroxy-lower-alkyl)-amino; lower-alkyl-(hydroxy-lower-alkyl)-amino; basic saturated monocyclic heterocyclic radicals of less than twelve carbon atoms, as exemplified by piperidino; lower-alkyl-piperidino, e.g., 2-, 3-, or 4-lower-alkyl-piperidino; di-lower-alkyl-piperidino, e.g., 2,4-, 2,6-, or 3,5-di-lower-alkyl-piperidino; lower-alkoxy-piperidino; pyrrolidino; lower-alkyl-pyrrolidino; di-lower-alkyl-pyrrolidino; lower-alkoxy-pyrrolidino; morpholino, lower-alkyl-morpholino; di-lower-alkyl-morpholino; lower-alkoxy-morpholino; thiomorpholino; lower-alkyl-thiomorpholino; di-lower-alkyl-thiomorpholino; lower-alkoxy-thiomorpholino; piperazino; lower-alkyl-piperazino (e.g., C- or N$^4$-methylpiperazino); di-C-(lower-alkyl) piperazino; N$^4$-(lower-alkyl)-C-(lower-alkyl)-piperazino; N-(hydroxy-lower-alkyl)-piperazino; N-lower-alkanoyloxy lower-alkyl)-piperazino [e.g., N-(acetoxy-, isobutyroxy-, or octanoyloxyethyl or propyl)-piperazino]; lower-alkoxy-piperazino; N'-lower-alkoxy-lower-alkylpiperazino, e.g., N'-ethoxyethylpiperazino; and lower-carbalkoxy-piperazino. The terms "lower-alkyl" and "lower-alkoxy," when employed herein, include both straight and branched chain radicals of not more than eight carbon atoms.

The symbol Y, where it appears in this specification, represents a lower-alkylene radical, i.e., a divalent saturated hydrocarbon radical containing up to eight carbon atoms inclusive. The radical may be of straight or branched chain structure, preferably but not necessarily having the valences on terminal carbon atoms. Examples of lower-alkylene radicals are ethylene, 1,3-propylene, 1,2-propylene, 2-methyl-1,3-propylene, 1,4-butylene, 1,3-butylene, 2,3-butylene, 1,2-butylene, 3-methyl-1,4-butylene, pentylene, hexylene, 3,4-hexylene, heptylene, 2-ethyl-3-methyl-1,4-pentylene, 3,4-dimethyl-2,5-hexylene, octylene, and the like. In the compounds of the invention, radicals having a two carbon atom chain, such as isopropylene and especially ethylene, are preferred. In addition to the above significance of Y and B individually, the two taken together can be an N-(lower-alkyl-substituted)-3-pyrrolidyl or an N-(lower-alkyl-substituted)-3 (or 4)-piperidyl radical, which pyrrolidyl or piperidyl radicals can also be additionally substituted at the various ring carbon atoms by lower-alkyl groups.

The compounds of the present invention are prepared by the esterification of 4-carboxyalkyl-2-pyrrolidinones and -2-thionpyrrolidinones with aminoalcohols. Preferred acids are those having the formula:

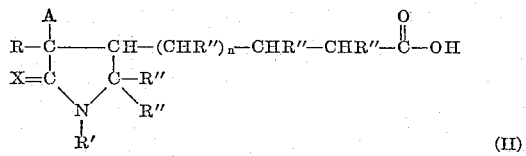

wherein the symbols have the values previously assigned.
Exemplary starting acids are:

1,3-diisopropyl-3-phenyl-2-pyrrolidinone-4-propionic acid
1-allyl-3-cyclohexyl-3-phenyl-2-pyrrolidinone-4-propionic acid
1-phenethyl-3-methyl-3-phenyl-2-pyrrolidinone-4-propionic acid
1-isopropyl-3-benzyl-3-phenyl-2-pyrrolidinone-4-propionic acid
1-isopropyl-3-(2'- or 3'-thienyl)-3-phenyl-2-pyrrolidinone-4-propionic acid
1-isopropyl-3-(2'- or 3'-thenyl)-3-phenyl-2-pyrrolidinone-4-propionic acid
1-isopropyl-3-(p-methoxyphenyl)-3-phenyl-2-pyrrolidinone-4-propionic acid
1-isopropyl-3-(m-chlorophenyl)-3-phenyl-2-pyrrolidinone-4-propionic acid
1-isopropyl-3-(o-methylphenyl)-3-phenyl-2-pyrrolidinone-4-propionic acid
1-isopropyl-3,3-diphenyl-2-pyrrolidinone-4-propionic acid
1-isopropyl-3-cyclopentyl-3-phenyl-2-pyrrolidinone-4-propionic acid
1isopropyl-3,3-diphenyl-2-pyrrolidinone-4-butyric acid
1-isopropyl-3,3-diphenyl-5-methyl-2-pyrrolidinone-4-butyric acid
1-isopropyl-3,3-diphenyl-5,5-dimethyl-2-pyrrolidinone-4-butyric acid
1-benzyl-3,3-diphenyl-5-methyl-2-pyrrolidinone-4-propionic acid
1-methyl-3,3-diphenyl-2-pyrrolidinone-4-butyric acid
1-isopropyl-3,3-diphenyl-2-pyrrolidinone-4-(beta-methyl) propionic acid
1-isopropyl-3,3-diphenyl-2-pyrrolidinone-4-(alpha-methyl)propionic acid
1-isobutyl-3,3-diphenyl-2-pyrrolidinone-4-propionic acid
1-cyclohexyl-3,3-diphenyl-2-pyrrolidinone-4-propionic acid
1-benzyl-3,3-diphenyl-2-pyrrolidinone-4-propionic acid
1-isobutyl-3-(3'-pyridyl)-3-phenyl-2-pyrrolidinone-4-propionic acid
1-ethyl-3,3-diphenyl-2-pyrrolidinone-4-propionic acid
1-benzyl-3,3-diphenyl-2-pyrrolidinone-4-propionic acid
1-cyclohexyl-3,3-diphenyl-2-pyrrolidinone-4-propionic acid
1-n-butyl-3-(3'-pyridyl)-3-(p-methoxyphenyl)-2-pyrrolidinone-4-propionic acid
1-ethyl-3-isopropyl-3-phenyl-2-pyrrolidinone-4-propionic acid
1,3-diisopropyl-3-phenyl-2-pyrrolidinone-4-propionic acid
1,3-diisopropyl-3-phenyl-2-pyrrolidinone-4-butyric acid
1-isopropyl-3-methyl-3-phenyl-2-pyrrolidinone-4-butyric acid
1-isopropyl-3-cyclopentyl-3-phenyl-2-pyrrolidinone-4-butyric acid
1-isopropyl-3-cyclohexyl-3-phenyl-2-pyrrolidinone-4-butyric acid
1-isopropyl-3,3-diphenyl-2-pyrrolidinone-4-(gamma-methyl)butyric acid
1-isopropyl-3,3-diphenyl-2-pyrrolidinone-4-(alpha-methyl)butyric acid
1-isopropyl-3,3-diphenyl-2-pyrrolidinone-4-(beta-methyl) butyric acid, the corresponding -2-thionpyrrolidinone compounds, and the like.

These acids may be employed per se or in the form of lower-alkyl esters or metal salts thereof, but are preferably employed in the form of their acid halides, as more fully disclosed hereinafter.

The starting aminoalkanols employed according to the invention are amino-lower-alkanols, preferably having the formula:

$$HO—Y—B \qquad (III)$$

wherein the symbols B and Y have the values given hereinbefore. These alcohols have a hydroxy group on one carbon atom and an amino radical "B" on another. The carbon chain may be straight or branched and otherwise as indicated hereinbefore. Examples of amino-lower-alkanols which may be employed as starting alcohols include aminoethanol, 1-aminopropanol-3, 1-aminopropanol-2, 1-amino-2-methylpropanol-3, 1-aminobutanol-4, 1-aminobutanol-3, 1-aminobutanol-2, 2-aminobutanol-3, 1-amino-3-methylbutanol-4, 1-aminopentanol-5, 1-aminohexanol-6, 3-aminohexanol-4, 1-aminoheptanol-7, 1-amino-2-ethyl-3-methylpentanol-4, 2-amino-3,4-dimethylhexanol-5, 1-aminooctanol-8, in all of which the amino radical has any of the values previously indicated for "B" in the foregoing, and the like. In addition, various 1-lower-alkyl-3-pyrrolidinols and 1-lower-alkyl-3- or 4-piperidinols, which may be additionally C-substituted by lower-alkyl groups at the various ring carbon atoms, can also be employed as starting alcohols. Specific examples of aminoalkanols are aminoethanol, dimethylaminoethanol, diethylaminoethanol, dipropylaminoethanol, diisopropylaminopropanol, hexamethyleneiminoethanol, piperidinoethanol, pyrrolidinoethanol, 1-methyl-3-pyrrolidinol, 1-isopropyl-3-pyrrolidinol, 1-methyl-4-piperidinol, 1-isopropyl-4-piperidinol, 1-ethyl-3-pyrrolidinol, 1,5-dimethyl-3-pyrrolidinol, 1,5,5-trimethyl-3-pyrrolidinol, 1,3-dimethyl-4-piperidinol, and 2-(N'-methylpiperazino)-propanol-1, to name but a few. The aminoalkanols are known compounds and may be employed per se, or in the form of an alkoxide, as further disclosed hereinafter. Alternatively, aminoalkyl halides of the identical formula as (III) above, but having a halogen atom in place of the hydroxy group, may be employed, as more fully disclosed in the following.

The preferred method of preparing the desired esters is to convert the starting 4-carboxyalkyl-2-pyrrolidinone compound, a pyrrolidinone-4-alkanoic acid, to the acid halide by treatment with at least a molecular equivalent of a halogenating agent, e.g., thionyl chloride, hydrogen chloride, hydrogen bromide, phosphorous tribromide, phosphorous oxychloride, or phosphorous pentachloride, alone or in the presence of a solvent which is inert to the reaction system, e.g., benzene, chloroform, or the like. The reaction time is usually about one hour. The reaction is generally continued until the infrared spectrum of the solution indicates complete conversion of the carboxyl group to the carbonyl halide group. The acid halide may be isolated, but need not be.

When a molecular equivalent, or a slight excess, of halogenating agent has been used, the resulting solution of the 4-alkanoyl halide may be treated directly with at least a molecular equivalent of aminoalcohol at such a temperature and addition rate that the reaction is easily controlled. Temperatures of zero to fifty degrees centigrade are convenient; considerably broader ranges can be used. Completion of reaction is usually assured by refluxing for a period of up to about one hour. When an excess of halogenating agent is used, the excess is usually removed at reduced pressure before reaction of the 2-pyrrolidinone-4-alkanoyl halide with the aminoalcohol. After complete reaction the mixture is concentrated in vacuo and the resulting hydrohalide salt of the desired aminoester crystallized from a suitable solvent. In cases where the salt fails to crystallize or when it is desirable to isolate the free base, the hydrohalide salt may be converted to the free base by partition between an alkaline aqueous solution and a water-insoluble solvent, concentration of the solvent, and crystallization and/or vacuum distillation of the free base. The base may then be converted to an acid-addition or quaternary ammonium salt by reaction with an acid or alkyl halide, or the like, as hereinafter described.

Another manner of preparing the compounds of the invention is by the reaction of the acid and the selected aminoalcohol in the presence of a suitable esterification catalyst, e.g., hydrogen chloride, sulfuric acid, cation exchange resins, or an aromatic sulfonic acid such as benzene or p-toluene sulfonic acid.

Although the preferred manner of preparing the compounds of the invention comprises reacting an aminoalcohol with the 4-carboxyalkyl-2-pyrrolidinone or 2-thionpyrrolidinone or an acid halide derivative thereof, the esters may be prepared in other conventional ways. Thus, the acid or an alkali or alkaline earth metal salt of the acid may be heated together with a suitable amino-lower-alkyl halide, preferably wherein the halogen has an atomic weight greater than nineteen, usually in a solvent such as isopropanol, isopropyl ether, or butanol, and the desired ester isolated from the reaction product. Alternatively, a lower-alkyl ester of the acid may be reacted with an aminoalkanol. Moreover, metal alcoholates of the aminoalkanols may alternatively be employed for rection with the acyl halides. The preferred metal alcoholates are the alkali and alkaline earth metal alcoholates.

The method of preparing the compounds of the present invention, then, in its broader aspects, comprises reacting a compound having the formula:

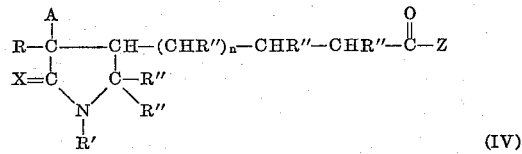

wherein Z is halogen, hydroxy, or a metal alkoxide radical OMe wherein Me is an alkali or alkaline earth metal, or an alkoxide radical $OR_1$ wherein $R_1$ is a lower-alkyl group, and the other symbols have the values stated previously, with a compound having the formula:

$$Z^1-Y-B \qquad (V)$$

wherein $Z^1$: is halogen or hydroxy when Z is hydroxy, is hydroxy or metal alkoxide OMe when Z is halogen, is hydroxy when Z is alkoxy $OR_1$, and is halogen when Z is metal alkoxide OMe, and wherein the other symbols have the values previously assigned, to split out water, hydrogen halide, a metal halide, or a lower alkanol, with concurrent production of the desired aminoester.

The compounds of the invention are most conveniently employed in the form of non-toxic acid-addition or quaternary ammonium salts. Such salts also have improved water-solubility. Although the non-toxic salts are preferred, any salt may be prepared for use as a chemical intermediate, as in the preparation of another but non-toxic acid-addition salt. The free basic compounds of Formula I may be conveniently converted to their quaternary ammonium or acid addition salts by reaction of the free base with the selected acid or acid ester, e.g., an alkyl, alkenyl, or aralkyl halide, sulfate, or sulfonate, preferably in the presence of an organic solvent inert to the reactants and reaction products under the conditions of the reaction. The acids which can be used to prepare the preferred non-toxic acid addition salts are those which produce, when combined with the free bases, salts the anions of which are relatively innocuous to the animal organism in therapeutic doses of the salts, so that beneficial physiological properties inherent in the free bases are not vitiated by side-effects ascribable to the anions.

Appropriate acid-addition salts are those derived from mineral acids such as hydrochloric acid, hydrobromic acid, hydroiodic acid, nitric acid, sulfuric acid, and phosphoric acid; and organic acids such as acetic acid, citric acid, lactic acid, fumaric acid, and tartaric acid. The preferred acid addition salt is the hydrochloride. The quaternary ammonium salts are obtained, e.g., by the addition of alkyl, alkenyl, cycloalkyl, cycloalkenyl or aralkyl esters of inorganic acids or organic sulfonic acids, to the free base form of the selected tertiary amino compound. The alkyl, cycloalkyl, cycloalkenyl, alkenyl, or aralkyl esters so used include such compounds as methyl chloride, methyl bromide, methyl iodide, ethyl bromide, propyl chloride, allyl chloride, allyl bromide, dimethyl sulfate, methyl benzenesulfonate, methyl p-toluene sulfonate, benzyl halides such as p-chlorobenzyl chloride and p-nitrobenzyl chloride, and the like.

The acid-addition salts are prepared either by dissolving the free base in an aqueous solution containing the appropriate acid and isolating the salt by evaporating the solution, or by reacting the free base and the selected acid in an organic solvent, in which case the salt ordinarily separates directly or can be conventionally recovered by concentration of the solution or the like. Conversely the free base may be obtained conventionally by neutralizing the acid-addition salt with an appropriate base such as ammonia, ammonium hydroxide, sodium carbonate or the like, extracting the liberated base with a suitable solvent, illustratively ethyl acetate or benzene, drying the extract and evaporating to dryness or fractionally distilling, or in other conventional manner.

The quaternary ammonium salts are prepared by mixing the free base and the selected alkyl, alkenyl, cycloalkyl, or aralkyl ester in an organic solvent, which as usual is inert to the reactants and reaction product under the conditions of reaction. Heating may be used to facilitate the reaction. The quaternary ammonium salt ordinarily separates directly or can be obtained by concentration of the solution or isolation in other conventional manner.

When there are two or more basic nitrogen atoms present in the compounds of the invention, poly-acid-addition and poly-quaternary ammonium salts may be obtained by employing the proper increased molar ratios of ester or acid to the free base.

The starting acids employed according to the method of the invention are obtained by hydrolysis of the corresponding 4-cyanoalkyl-3,3-disubstituted-1-substituted-2-pyrrolidinones and 2-thionpyrrolidinones. These, in turn, may be prepared by reaction of an alkali metal cyanide with the appropriate 4-haloalkyl-2-pyrrolidinone or 2-thionpyrrolidinone. The 4-haloalkyl - 2 - thionpyrrolidinones are the reaction product of phosphorous pentasulfide and the corresponding 2-pyrrolidinone. The 4-haloalkyl-3,3-disubstituted-1-substituted-2 - pyrrolidinones are produced by the rearrangement of an alpha-(1-substituted-3-pyrrolidyl)-alpha,alpha-disubstituted acetic acid halide which is in turn prepared from the corresponding acetonitrile.

The procedure is more fully disclosed in the following.

STARTING ACETONITRILES

The alpha-(1 - substituted - 3 - pyrrolidyl)-alpha,alpha-disubstituted (e.g., benzyl phenyl, methyl phenyl, or diphenyl) acetonitriles are generally prepared by alkylating an alkali metal, e.g., sodium, salt of the appropriate alpha,alpha-disubstituted-acetonitrile, e.g., benzylphenylacetonitrile, methylphenylacetonitrile, or diphenylacetonitrile, with the appropriate 1-substituted-3-halo (e.g., chloro)-pyrrolidine in a suitable solvent such as dry toluene. The sodium salt of the alpha,alpha-disubstituted-acetonitrile is formed by the reaction of the nitrile with sodium amide in the dry solvent, e.g., toluene. The condensation with the 3-halopyrrolidine is usually carried out with the application of heat, e.g., in refluxing benzene, toluene, or a like solvent, for an extended period, e.g., approximately three hours. The solvent, e.g., benzene, solution is then washed with water and the product extracted, as with 1 N hydrochloric acid. This acid extract may then be basified, for example with sodium hydroxide, extracted with a water-insoluble solvent such as ether or chloroform, the solution washed and dried, as over sodium sulfate, concentrated, and the residue distilled in vacuo. This alkylation procedure is illustrated by the following Preparation 1.

1-substituted-3-halopyrrolidines which may be used as intermediates in preparing starting acetonitriles are those tertiary pyrrolidines which have a halogen bonded to the heterocyclic ring in the three position. Exemplary 1-substituted-3-halopyrrolidines are 1-methyl-3-chloropyrrolidine, 1-ethyl-3-bromopyrrolidine, 1-propyl-3-iodopyrrolidine, 1-isopropyl-3-chloropyrrolidine, 1-cyclohexyl-3-chloropyrrolidine, 1-phenethyl-3-bromopyrrolidine, 1-benzyl-3-chloropyrrolidine, and the like. The 1-substituted-3-halopyrrolidines may also have one or more methyl groups bonded to the ring in any one or more than one position, illustratively the 2, 4, or 5 positions, for example 1-ethyl-3-chloro-4-methylpyrrolidine, 1-isopropyl-2-methyl-3-iodo-pyrrolidine, 3-chloro-1,5-dimethyl-pyrrolidine, 1,2,5-, 1,2,4-, or 1,2,2-trimethyl-3-chloropyrrolidine, and the like. A suitable method for the preparation of starting 1-substituted-3-halopyrrolidines is found in the Journal of Medicinal and Pharmaceutical Chemistry 2, 523 (1960). Such starting 3-halopyrrolidines, methyl-3-halopyrrolidines and polymethyl-3-halopyrrolidines may also be prepared by standard procedure from certain methyl-3-pyrrolidinols disclosed by C. W. Ryan et al., J. Org. Chem. 27, 2901–2905 (1962) or certain related compounds disclosed by Lunsford in U.S. Patent 2,830,997 and in other sources cited therein. The methyl substituents in the starting substituted acetonitrile and in the prior 1-substituted-3-halopyrrolidine intermediate appear as substituents in the final pyrrolidinone, e.g., the 4-carboxylalkyl-2-pyrrolidinone and 2-thionpyrrolidinone compounds having a 3-methyl substituent are prepared from a starting alpha-methyl-acetonitrile, those having a 5-methyl substituent are prepared from a 2-methyl-3-halopyrrolidine, and those having side-chain methyl substituents (such as the gamma-carboxy-2'-propyl or beta-carboxypropyl compounds) are prepared from 4- and 5-methyl substituted-3-halopyrrolidines.

4-HALOALKYL-2-PYRROLIDINONES

The 4-haloalkyl - 3,3 - disubstituted-1-substituted-2-pyrrolidinones may be prepared by the rearrangement of the acid via the acyl halide. The acid may be prepared directly from the acetonitrile by hydrolysis, or it may be prepared by hydrolysis of the intermediate amide which in turn may be prepared from the acetonitrile by a partial hydrolysis.

In preparing the 4-haloalkyl compounds from the alpha-(1-substituted - 3 - pyrrolidyl)-alpha,alpha-disubstituted acetonitriles, the nitrile is first hydrolyzed to the corresponding acid by the action of a strong mineral acid, e.g., concentrated sulfuric acid, for example, approximately sixty to eighty percent, preferably seventy percent, or concentrated (e.g., near 35 percent) hydrochloric acid. Usually this hydrolysis is readily effected by heating at a relatively high temperature, e.g., 100 to 140, preferably 130 to 140 degrees centigrade, for an extended period of time, e.g., from five to 48 hours. Lower temperatures increase the required reaction period, higher temperatures may shorten it somewhat but are not recommended since decarboxylation may occur from excessive reaction temperatures or periods and the incidence of undesired side-reactions, e.g., sulfonation, is thereby also increased. Upon completion of the hydrolysis, the solution of the acid may be cooled, as by pouring onto ice, and basified with an alkali, e.g., sodium or potassium hydroxide, ammonium hydroxide, or the like, and extracted with an appropriate organic solvent. Halogenated organic solvents such as chloroform, ethylene dichloride, and the like are preferred. The resulting solution of the basic salt is then acidified, as with an anhydrous mineral acid, preferably by passing anhydrous hydrogen chloride gas into the solution, the solution of the resulting acid salt dried with a conventional drying agent such as sodium sulfate, magnesium sulfate, calcium chloride, or the like, and finally concentrated to leave the crude salt of the acid.

The residual acid salt may be converted without isolation to the corresponding mixed anhydride, i.e., the acyl halide, and then rearranged to the 4-haloalkyl-2-pyrrolidinone. In such case, the residual acid salt is usually heated, preferably under reflux, with an acid anhydride capable of forming a mixed anhydride therewith, together with a halogen ion (which halogen ion may either be added to the reaction or generated in situ), for example, with thionyl chloride, phosphorous trichloride, corresponding bromides such as phosphorus tribromide and thionylbromide, or the like, until disappearance of the characteristic acyl halide carbonyl frequency from the infrared spectrum, usually for a period of two to three hours, during which reaction the acid first converts to the acid halide and then rearranges to the 4-haloalkyl-2-pyrrolidinone. Halides of strong acids are preferred, and temperatures up to about 100 degrees centrigrade are usually employed.

The acyl halides or other mixed anhydrides are unstable even at room temperature and rearrange readily upon heating. It is therefore most convenient to continue heating of the reaction product containing the same, in the presence of the selected halide ion, without any attempt at isolation, until establishment of the characteristic pyrrolidinone carbonyl frequency, indicative of completion of the preparation of the desired 4-haloalkyl-2-pyrrolidinone via the rearrangement mechanism.

When the acid anhydride is used as solvent as well as a reactant, a considerable excess may be and frequently is employed, although when the anhydride is acetic or other lower-aliphatic, preferably lower-alkanoic, acid anhydride, as in cases when a halogen anion is extraneously introduced into the reaction mixture, a polar solvent such as methyl ethyl ketone may be used to facilitate solution of the anion introduced. After completion of the reaction, any excess reagent may be removed from the organic product under vacuum and the residue crystallized from an appropriate solvent or solvent mixture. The crystallized product from this reaction sequence is the desired 4-haloalkyl - 3,3 - disubstituted - 1 - substituted-2-pyrrolidinone. This procedure is illustrated by the following Preparation 2.

4-HALOALKYL-2-THIONPYRROLIDINONES

The 4-haloalkyl-3,3-disubstituted-1-substituted-2-thionpyrrolidinones may be prepared by the reaction of a corresponding 2-pyrrolidinone with phosphorous pentasulfide ($P_2S_5$). The 4-cyanoalkyl-2-thionpyrrolidinones can be prepared in the same manner. The conditions of this reaction may vary considerably, but in general are as follows:

A suspension of the 2-pyrrolidinone and an intimate mixture of phosphorus pentasulfide and potassium sulfide in an inert solvent, usually an approximately 0.4 molar quantity of phosphorous pentasulfide together with an equal weight of potassium sulfide in dry toluene (approximately four liters of dry toluene ordinarily being used per mole of pyrrolidinone), is stirred and refluxed for an extended period, usually about 15 to 24 hours. Usually the mixture is then decolorized with activated charcoal and filtered while hot. In some cases, the resulting 2-thionpyrrolidinone precipitates from solution upon cooling and is removed by filtration and recrystallized from an appropriate solvent. In other cases, the toluene filtrate is concentrated in vacuo and the residual crude thionpyrrolidinone is crystallized and may be recrystallized from an appropriate solvent.

The procedure is essentially that described generally by R. N. Hurd and G. De La Mater, Chemical Reviews 61, 45 (1961), for the conversion of amides to thionamides. However, these authors state that a reaction time of approximately one hour is usually sufficient, while conversion of the 2-pyrrolidinones of the present series to 2-thionpyrrolidinones appears to require a reaction time of about 15 to 24 hours in most cases.

The procedure for the conversion of 2-pyrrolidinones to the corresponding 2-thionpyrrolidinones is illustrated by the following Preparations 10 and 11.

4-CYANOALKYL COMPOUNDS

The 4-cyanoalkyl-2-pyrrolidinones and 2-thionpyrrolidinones are prepared by reacting the corresponding 4-haloalkyl compounds with an alkali metal cyanide, e.g., sodium cyanide, usually by heating the reactants together in a suitable organic solvent, preferably dimethylformamide or the like. This procedure can be applied equally well to 4-(beta-haloalkyl) compounds and to 4-(gamma-haloalkyl) compounds in each case to introduce the cyano group in place of the halogen atom, and thus to extend the 4-alkyl carbon chain. Representative examples of this procedure are given in Preparations 3 and 8.

4-CARBOXYALKYL COMPOUNDS

The 4-carboxyalkyl-2-pyrrolidinones and 2-thionpyrrolidinones are prepared by conventional acid hydrolysis of the corresponding 4-cyanoalkyl compounds, employing sulfuric acid, for example, approximately sixty to eighty percent, preferably seventy percent, aqueous sulfuric acid, or concentrated hydrochloric acid. This hydrolysis is usually effected by heating at a temperature not in excess of 100 degres centigrade for a period of 24 hours. Upon completion of the hydrolysis, the solution of the acid may be cooled, as by pouring onto ice, and basified with an alkali, e.g., sodium or potassium hydroxide, ammonium hydroxide, or the like, and extracted with an appropriate organic solvent. Halogenated organic solvents such as chloroform, ethylene dichloride, and the like are preferred. The resulting solution of the basic salt is then acidified, as with an anhydrous mineral acid, preferably by passing anhydrous hydrogen chloride gas into the solution, the resulting solution of the acid salt dried with a conventional drying agent such as sodium sulfate, magnesium sulfate, calcium chloride, or the like, and finally concentrated to leave the crude salt of the acid. This or equivalent procedure is illustrated by the following Preparations 4, 9, 12, 13, and 14.

4-CARBONYL HALIDE COMPOUNDS

The pyrrolidinone or thionpyrrolidinone-4-alkanoic acids may if desired be converted to the corresponding acyl halides by reaction with a suitable halogenating agent such as thionyl chloride or bromide, phosphorus trichloride, or tribromide, or the like, in the usual manner for forming acid halides, and the product crystallized from a suitable organic solvent such as benzene. Representative procedure is given in Preparation 5.

CHAIN EXTENSION AND METHYL SUBSTITUTION

In the event it is desired that the carbon chain at the 4-position of the pyrrolidinone nucleus contain more than two carbon atoms in a straight chain, this is conveniently accomplished by starting with the appropriate propionyl halide and reducing it to the corresponding omega-hydroxyalkyl compound, as with sodium borohydride, in accordance with conventional procedure, as illustrated by Preparation 6. The 4-(omega-hydroxyalkyl) compound is then reacted with a halogenating agent, e.g., thionyl chloride, phosphorous trichloride, the corresponding bromo reagents, or the like, to replace the hydroxy group by a halogen atom and produce the corresponding omega-haloalkyl compound in accord with Preparation 7. These omega-haloalkyl compounds may then be converted to nitriles having an additional carbon atom in the carbon chain (e.g., Preparation 8), which nitriles may then be converted to the desired acid or acid halide, all according to previously disclosed procedure (e.g., Preparations 4 and 5).

The starting acids having methyl groups in various positions of the pyrrolidinone nucleus and side chain are prepared by the employment of a selected methyl-substituted acetonitrile in the first step of the process, as already outlined under "Starting Acetonitriles." In addition, the 4-(4'-carboxy-2'-butyl), the 4-(3'-carboxy-2'-methylpropyl), and the 4-(3'-carboxybutyl) compounds are prepared in the same manner, by hydrolysis of the corresponding nitrile, in turn prepared from the corresponding chloro compound and sodium cyanide, the chloro compound being produced from the corresponding hydroxy compound. The hydroxy compounds are produced in the first two cases by reducing the corresponding carbonyl chloride compound with sodium borohydride, while in the last case the hydroxy compound is produced by reaction of the corresponding 4-(beta-formylethyl) compound (prepared by reduction of the corresponding carbonyl chloride) with a methyl magnesium halide under usual Grignard reaction conditions. The carbonyl chlorides are prepared from the corresponding acids in accord with the foregoing disclosure and particularly in accord with Preparation 5 following.

The following preparations and examples are given by way of illustration only and are not to be construed as limiting.

PREPARATION 1

*Alpha - (1-isobutyl-3-pyrrolidyl)-alpha,alpha-diphenyl-acetonitrile.*—A suspension of the sodium salt of diphenylacetonitrile was formed by the dropwise addition at fifty degrees centigrade of 193 grams (1.0 mole) of diphenylacetonitrile to a stirred suspension of 43 grams (1.1 mole) of sodium amide in one liter of dry toluene. After addition was complete, the mixture was refluxed for four hours and then, to the refluxing mixture, 162 grams, (1.0 mole) of 1-isobutyl-3-chloropyrrolidine was added at a rapid dropwise rate with continuous stirring. After addition was complete, stirring and refluxing were continued for three hours. The mixture was then cooled and extracted with 1 N hydrochloric acid. The aqueous layer together with an oil layer were separated, made basic with dilute sodium hydroxide, and extracted with ether. The ethereal solution was dried over sodium sulfate and concentrated and the residue distilled in vacuo. Yield 250 grams (78 percent); boiling point 190 to 200 degrees centigrade at 0.15 millimeter of mercury. The material crystallized from a four to one ethanol and water mixture. Melting point 76 to 77 degree centigrade.

The corresponding 1-isopropyl compound is prepared in the same manner. Melting point 73 to 74 degrees centigrade.

PREPARATION 2

*4 - (beta-chloroethyl)-3,3-diphenyl-1-isobutyl-2-pyrrolidinone.*—A solution of 100 grams (0.314 mole) of alpha-(1-isobutyl-3-pyrrolidyl)-alpha, alpha-diphenylacetonitrile in 500 grams of seventy percent sulfuric acid was heated at 130 to 140 degrees centigrade for 48 hours, poured onto ice, made basic with sodium hydroxide, and extracted with chloroform. The chloroform solution was acidified with hydrogen chloride gas, dried over sodium sulfate, and concentrated. The residue was refluxed in 500 milliliters of thionyl chloride for three hours, the resulting solution was concentrated in vacuo, and the residue was crystallized from isopropyl ether. Yield 69 grams (62 percent); melting point 113–113.5 degrees centigrade.

The corresponding 1-isopropyl compound is prepared in the same manner. Melting point 106 to 108 degrees centigrade.

A tabulation of suitable 4-(haloalkyl)-3,3-disubstituted-1-substituted-2-pyrrolidinones prepared in this manner includes:

Table I 4-(BETA-HALOETHYL)-3,3-DISUBSTITUTED-1-SUBSTITUTED-2-PYRROLIDINONES

| Substituent at position— | | | Halogen | M.P., °C |
|---|---|---|---|---|
| 1 | 2 | 3 | | |
| $CH_3$ | $C_6H_5$ | $C_6H_5$ | Cl | 140–1 |
| $C_2H_5$ | $C_6H_5$ | $C_6H_5$ | Cl | 117–9 |
| $C_2H_5$ | $C_6H_5$ | $C_6H_5$ | Br | 129–30 |
| $i$-$C_3H_7$ | $C_6H_5$ | $C_6H_5$ | Cl | 106–8 |
| $i$-$C_3H_7$ | $C_6H_5$ | $CH_3$ | Cl | 102–4 |
| $i$-$C_3H_7$ | $i$-$C_3H_7$ | $C_6H_5$ | Cl | 95–6 |
| $i$-$C_3H_7$ | $C_6H_5$ | $C_5H_5$ | Cl | 74.5–75 |
| $i$-$C_3H_7$ | $C_6H_{11}$ | $C_6H_5$ | Cl | 109–11 |
| $i$-$C_4H_9$ | $C_6H_5$ | $C_6H_5$ | Cl | 113.5–4.5 |
| $cy$-$C_6H_{11}$ | $C_6H_5$ | $C_6H_5$ | Cl | 151–2 |
| $C_6H_5CH_2$ | $C_6H_5$ | $C_6H_5$ | Cl | 110 |
| $i$-$C_3H_7$ [a] | $C_6H_5$ | $C_6H_5$ | I | 147–149 |
| $i$-$C_3H_7$ [a] | $C_6H_5$ | $C_6H_5$ | Cl | 85–86.5 |
| $C_2H_5$ | $C_6H_5$ | 3-pyridyl | Cl | 100–103 |
| $C_2H_5$ [b] | $C_6H_5$ | $C_6H_5$ | Cl | 150–153 |
| $C_2H_5$ [c] | $C_6H_5$ | $C_6H_5$ | Cl | 141–142 |

[a] 4-(gamma-chloropropyl) compound.
[b] 4-(gamma-chloro-2′-propyl) compound.
[c] 4-(beta-chloropropyl) compound.

PREPARATION 3

*3,3 - diphenyl - 1-isopropyl-2-pyrrolidinone-4-propionitrile.*—A mixture of 342 grams (1.0 mole) of 4-beta-chloroethyl-3,3-diphenyl-1-isopropyl-2-pyrrolidinone and 75 grams (1.5 mole) of sodium cyanide in one liter of dimethylformamide was stirred and heated to a temperature of 100 degrees centigrade over a one-hour period, and this temperature was maintained for an additional three hours. The mixture was poured into ice water and the precipitated white crystalline solid filtered and recrystallized from isopropanol. Yield, 288 grams (87 percent); melting point 150 to 151 degrees centigrade.

The corresponding 1-ethyl-4-(3′-cyano-2′-propyl) compound is prepared in the same manner from 4-(3′-chloro-2′ - propyl) - 3,3 - diphenyl-1-ethyl-2-pyrrolidinone. The compound has a melting point of 177 to 180 degrees centigrade. Additional nitriles are prepared in the same manner from the halides of Table I.

PREPARATION 4

*3,3 - diphenyl - 1-isopropyl-2-pyrrolidinone-4-propionic acid.*—A mixture of 94 grams (0.28 mole) of 3,3-diphenyl-1-isopropyl-2-pyrrolidinone-4-propionitrile and 500 milliliters of 70 percent sulfuric acid was stirred and heated at 80 to 90 degrees centigrade for 24 hours and poured into ice and water. The precipitated solid was filtered and recrystallized from a chloroform-ligroin mixture. Yield, 93 percent; melting points 175 to 176 degrees centigrade.

The corresponding 1-ethyl-4-(3′-carboxy-2′-propyl) compound is prepared in the same manner. Additional acids are prepared in the same manner from the halides of Table I via the intermediate nitrile.

PREPARATION 5

*3,3 - diphenyl - 1-isopropyl-2-pyrrolidinone-4-propionyl chloride.*—A suspension of 144 grams (0.41 mole) of 3,3-diphenyl-1-isopropyl-2-pyrrolidinone-4-propionic acid in 500 milliliters of dry benzene was treated with 97.5 grams (0.82 mole) of thionyl chloride at 20 to 25 degrees centigrade dropwise and with stirring. The resulting solution was refluxed for one hour and concentrated in vacuo. The residue was crystallized from benzene. Melting point 141.5 to 143.5 degrees centigrade.

Additional acid halides are prepared in the same manner from the corresponding acids.

PREPARATION 6

*3,3 - diphenyl-4-(gamma-hydroxypropyl)-1-isopropyl-2-pyrrolidinone.*—To a suspension of ten grams of sodium borohydride in 100 milliliters of dry dioxane was added rapidly and with stirring 25 grams (0.0675 mole) of 3,3-diphenyl-1-isopropyl-2-pyrrolidinone-4-propionyl chloride in 200 milliliters of dry dioxane. The mixture was stirred at reflux for four hours, cooled to room temperature and 100 milliliters of water added carefully. The mixture was partitioned between 500 milliliters of water and 300 milliliters of chloroform; the water layers extracted with additional chloroform, the chloroform solutions combined, dried with anhydrous sodium sulfate and concentrated on a rotary evaporator. The residue was crystallized from 70 percent ethanol and recrystallized twice from isopropyl ether. Yield, ten grams (44 percent); melting point 142 to 143 degrees centigrade.

Additional hydroxyalkyl-2-pyrrolidinones and 2-thionpyrrolidinones are prepared in the same manner.

PREPARATION 7

*4 - (gamma-chloropropyl)-3,3-diphenyl-1-isopropyl-2-pyrrolidinone.*—A solution of 7.4 grams (0.062 mole) of thionyl chloride in fifty milliliters of chloroform was added dropwise to a solution of 10.5 grams (0.031 mole) of 3,3-diphenyl-4-(gamma-hydroxypropyl) - 1 - isopropyl-2-pyrrolidinone and 4.9 grams (0.062 mole) of pyridine in 100 milliliters of chloroform with stirring and ice-bath cooling. When addition was complete the mixture was heated to reflux and maintained at reflux for five hours, and then cooled with an ice bath. Water (100 milliliters) was added with stirring followed by fifty milliliters of 3 N hydrochloric acid. The chloroform layer was separated, dried with anhydrous sodium sulfate and concentrated in vacuo and the residue crystallized from 150 milliliters of about sixty percent ethanol. Yield, eight grams (72.5 percent); melting point 85 to 86.5 degrees centigrade.

Additional haloalkyl 2-pyrrolidinones and 2-thionpyrrolidinones are prepared in the same manner from the corresponding hydroxy compounds.

PREPARATION 8

*3,3-diphenyl-1-isopropyl - 2 - pyrrolidinone-4-butyronitrile. [4-(gamma-cyanopropyl)-3,3-diphenyl - 1 - isopropyl-2-pyrrolidinone.]*—A mixture of 3.9 grams (0.08 mole) of sodium cyanide, 9.2 grams (0.026 mole) of 4-(gamma-chloropropyl) - 3,3 - diphenyl-1-isopropyl-2-pyrrolidinone and 100 milliliters of dimethylformamide was stirred at reflux for seventeen hours. The mixture was filtered and the filtrate was concentrated in vacuo. The residue was crystallized twice from isopropyl alcohol. Yield, five grams (55%); melting point 107 to 108 degrees centigrade. A constant melting point of 126–127 degrees centigrade was obtained after several additional crystallizations.

Additional cyanoalkyl 2-pyrrolidinones and 2-thionpyrrolidinones are prepared in the same manner from the corresponding gamma-halo compounds.

PREPARATION 9

*3,3-diphenyl-1-isopropyl-2-pyrrolidinone-4-butyric acid and its acid halides.*—This acid and acid chloride or other halide are prepared from the nitrile of Preparation 8 in the manner given in Preparations 4 and 5. Additional acids and acid halides are prepared from the corresponding nitriles in the same manner.

PREPARATION 10

*4-(beta-chloroethyl) - 3,3-diphenyl-1-isopropyl-2-thionpyrrolidinone.*—A mixture of 150 grams (0.44 mole) of 4-(beta-chloroethyl) - 3,3 - diphenyl-1-isopropyl-2-pyrrolidinone, 23.3 grams (0.105 mole) of phosphorus pentasulfide and 25 grams of potassium sulfide in 700 milliliters of dry toluene was refluxed and stirred for twenty-four hours. The mixture was filtered while hot and the filtrate treated with decolorizing charcoal, filtered again and allowed to cool. The product precipitated from the solution in near analytical purity. Yield, 88 grams (56 percent); melting point 148 to 150 degrees centigrade. After recrystallization from toluene the melting point was 149 to 151 degrees centigrade.

The 1-ethyl and 1-methyl compounds are prepared in the same manner from the corresponding 2-pyrrolidinones. Additional 4-haloalkyl-2-thionpyrrolidinone compounds are prepared in the same manner from the corresponding 2-pyrrolidinones.

PREPARATION 11

*4-(beta-cyanoethyl) - 3,3-diphenyl-1-isopropyl-2-thionpyrrolidinone.*—A suspension of 166 grams (0.5 mole) of 4-(beta-cyanoethyl)-3,3-diphenyl-1-isopropyl - 2 - pyrrolidinone and an intimate mixture of 48.8 grams (0.22 mole) of phosphorus pentasulfide and 48.8 grams of potassium sulfide in two liters of dry toluene was stirred and refluxed for eighteen hours, filtered and the filtrate concentrated in vacuo. The residue was dissolved in hot isopropyl alcohol, treated with activated charcoal, filtered and allowed to cool, yielding 123 grams (70%) of the desired product; melting point 160 to 165 degrees centigrade. After one recrystallization from isopropyl alcohol, the melting point was 166 to 167 degrees centigrade.

The corresponding 1-ethyl, 1-methyl, and 1-cyclohexyl compounds are prepared in the same manner from the corresponding 2-pyrrolidinone. Additional 4-cyanoalkyl-2-thionpyrrolidinones are prepared in the same manner from the corresponding 2-pyrrolidinones. Alternatively, the 4-cyanoalkyl-2-thionpyrrolidinones are prepared from the corresponding 4-haloalkyl-2-thionpyrrolidinones by reaction with an alkali metal cyanide according to the procedure given for the 4-cyanoalkyl-2-pyrrolidinones (see Preparations 3 and 8) but under somewhat more stringent reaction conditions.

PREPARATION 12

*3,3 - diphenyl-1-isopropyl-2-thionpyrrolidinone-4-propionic acid and acid halides.*—A solution of 30 grams (0.086 mole) of 4-(beta-cyanoethyl)-3,3-diphenyl-1-isopropyl-2-thionpyrrolidinone in 200 grams of 70% sulfuric acid was stirred and heated at 75 degrees centigrade for eighteen hours, poured onto ice and extracted with chloroform. The chloroform extract was dried over anhydrous sodium sulfate and concentrated in vacuo and the residue crystallized from 400 milliliters of toluene and recrystallized twice from the same solvent. Yield, 22 grams (70%); melting point 191 to 194 degrees centigrade. The acid halides are prepared in the manner of Preparation 5.

PREPARATION 13

*3,3 - diphenyl-1-ethyl-2-thionpyrrolidinone-4-propionic acid and acid halides.*—A solution of 0.1 mole of 4-(beta-cyanoethyl)-3,3-diphenyl-1-ethyl - 2 - thionpyrrolidinone in 250 grams of 70% sulfuric acid is stirred and heated at 75 degrees centigrade for eighteen hours, poured onto ice and extracted with chloroform. The chloroform extract is dried over anhydrous sodium sulfate and concentrated in vacuo and the residue crystallized from an appropriate solvent, for example, toluene. The acid halides are prepared as indicated in Preparation 5.

PREPARATION 14

*3,3-diphenyl-1-methyl-2 - thionpyrrolidinone - 4 - propionic acid and 3,3-diphenyl-1-cyclohexyl-2-thionpyrrolidinone-4-propionic acid and acid halides.*—These compounds are prepared in the manner of Preparation 12 from 4-(beta-cyanoethyl)-3,3-diphenyl-1-methyl-2-thionpyrrolidinone and 4-(beta-cyanoethyl)-3,3-diphenyl - 1-cyclohexyl-2-thionpyrrolidinone, respectively. The acid halides are prepared from the acids in the manner of Preparation 5. Additional 2-thionpyrrolidinone-4 - alkanoic acids and acid halides are prepared in the same manner from the corresponding nitriles.

In the manner of the foregoing Preparations, 4-(carboxyalkyl)-3,3-disubstituted-1-substituted - 2 - pyrrolidinones and 2-thionpyrrolidinones of Formula II are prepared and, if desired, converted to their acid halides or other derivatives of Formula IV in conventional manner.

EXAMPLE 1.—DIMETHYLAMINOETHYL 1 - ISOPROPYL-3,3-DIPHENYL-2-PYRROLIDINONE - 4-PROPIONATE HYDROCHLORIDE

A solution of 25.0 grams (0.068 mole) of 1-isopropyl-3,3-diphenyl-2-pyrrolidinone-4-propionyl chloride in 200 milliliters of benzene was added at a rapid dropwise rate to a solution of 6.1 grams (0.068 mole) of beta-dimethylaminoethanol in 100 milliliters of benzene with stirring and maintenance of the temperature at fifteen degrees centigrade by external cooling. After addition was complete the temperature of the reaction mixture was raised to room temperature and then to reflux where it was maintained for one hour. The mixture was concentrated in vacuo and the residue was crystallized from ethyl acetate. The resulting white crystalline solid melted at 162 to 167 degrees centigrade and after recrystallization from the same solvent melted at 172 to 173 degrees centigrade. The yield was 80%.

*Anal.*—Percent calc. for $C_{26}H_{35}ClN_2O_3$: C, 68.03; H, 7.69; Cl, 7.72. Percent found: C, 67.88; H, 7.48; Cl, 7.76.

EXAMPLE 2.—DIMETHYLAMINOETHYL 1 - ISOPROPYL-3,3-DIPHENYL-2 - THIONPYRROLIDINONE-4-PROPIONATE HYDROCHLORIDE

Thionyl chloride (10.7 grams, 0.09 mole) was added dropwise to a refluxing, stirred solution of 30 grams (0.082 mole) of 1-isopropyl-3,3-diphenyl-2-thionpyrrolidinone-4-propionic acid in 500 milliliters of dry benzene and refluxing was continued for one hour after addition was complete. The solution was cooled to 10 degrees centigrade and 11.5 grams (0.13 mole) of beta-dimethylaminoethanol was added dropwise while the temperature was maintained at ten to twenty degrees centigrade with ice-bath cooling. The resulting solution was stirred for fifteen minutes at room temperature, refluxed for one hour, and concentrated in vacuo. The residue was partitioned between 500 milliliters of chloroform and 500 milliliters of dilute hydrochloric acid. The acid layer was discarded and the chloroform extract was washed with 200 milliliters of dilute sodium hydroxide, dried over anhydrous sodium sulfate and concentrated in vacuo. The residue was dissolved in 200 milliliters of hot toluene and treated with 200 milliliters of methyl isobutyl ketone containing three grams of hydrogen chloride. The resulting white solid was recrystallized twice from methyl isobutyl ketone which contained a small amount of methanol. Yield, 26 grams (67 percent); melting point 196 to 198 degrees centigrade.

*Anal.*—Percent calc. for $C_{26}H_{35}ClN_2O_2S$: C, 65.73; H, 7.43; N, 5.90. Found: C, 65.86; H, 7.51; N, 5.96.

EXAMPLE 3.—DIMETHYLAMINOETHYL 1 - ISOPROPYL-3,3-DIPHENYL-2-PYRROLIDINONE - 4- PROPIONATE METHOBROMIDE

A solution of 3.4 grams of methylbromide in dry ethyl ether was added to a dry ethyl ether solution of 10 grams of dimethylaminoethyl-1-isopropyl-3,3-diphenyl-2 - pyrrolidinone-4-propionate and the resulting mixture was allowed to stand at room temperature for one hour. A precipitate formed which was recrystallized from butanone. M.P. 175–180 degrees centigrade.

*Anal.*—Percent calc. for $C_{27}H_{37}BrN_2O_3$: C, 62.66; H, 7.21; N, 5.41. Found: C, 62.55; H, 7.26; N, 5.52.

The corresponding quaternary ammonium salt of the free base of Example 2 is prepared in the same manner.

EXAMPLE 4.—DIMETHYLAMINOETHYL 1 - ISOPROPYL-3,3-DIPHENYL-2-PYRROLIDINONE - 4- PROPIONATE METHOBROMIDE

A solution of 2.6 grams (0.024 mole) of dimethylaminoethyl chloride and 8.5 grams (0.024 mole) of 1-isopropyl-3,3-diphenyl-2-pyrrolidinone-4 - propionic acid in 150 milliliters of dry isopropyl alcohol was refluxed approximately sixteen hours, filtered and concentrated in vacuo. The resulting oil was partitioned between aqueous alkali and ether. The ether layer was dried over anhydrous sodium sulfate and treated with methyl bromide, which resulted in the formation of the same quaternary salt as prepared according to Example 3.

EXAMPLE 5.—4-(1-PIPERIDYL)-BUTYL 1-ISOPROPYL-3,3-DIPHENYL-2-PYRROLIDINONE-4 - PROPIONATE HYDROCHLORIDE

In the manner given in Example 1, 4-(1-piperidyl)-butyl 1-isopropyl-3,3-diphenyl-2-pyrrolidinone-4 - propionate hydrochloride was prepared from 4-(1-piperidyl)-butanol-1 and 1-isopropyl-3,3-diphenyl-2-pyrrolidinone-4-propionyl chloride. It was recrystallized from an ethyl alcohol-ether mixture. Melting point 197–199 degrees centigrade.

*Anal.*—Percent calc. for $C_{31}H_{43}ClN_2O_3$: C, 70.63; H, 8.22; N, 5.32. Found: C, 70.32; H, 8.27; N, 5.49.

EXAMPLE 6.—DIETHYLAMINOETHYL 1 - ISOPROPYL-3,3-DIPHENYL-2-PYRROLIDINONE - 4- PROPIONATE METHIODIDE

Hydrogen chloride was bubbled through a refluxing solution of 20 grams (0.057 mole) of 1-isopropyl-3,3-diphenyl-2-pyrrolidinone-4-propionic acid and 8 grams (0.068 mole) of diethylaminoethanol in 250 milliliters of chloroform over a five-hour period. The solution was washed with water and dilute sodium hydroxide, dried over anhydrous sodium sulfate and concentrated. The residue was dissolved in 75 milliliters of methyl isobutyl ketone and 8 grams (0.057 mole) of methyl iodide was added. The resulting precipitate was recrystallized from methyl isobutyl ketone-methanol and from isopropyl alcohol. Melting point 170–172 degrees centigrade.

*Anal.*—Percent cal. for $C_{30}H_{41}IN_2O_3$: N, 4.63. Percent found: N, 4.73.

EXAMPLE 7.—DIMETHYLAMINOETHYL 1 - ISOPROPYL-3,3-DIPHENYL-2 - THIONPYRROLIDINONE-4-PROPIONATE METHIODIDE.

Dimethylaminoethyl 1 - isopropyl-3,3-diphenyl-2-thionpyrrolidinone - 4 - propionate hydrochloride (5 grams, 0.0105 mole) was partitioned between 75 milliliters of methyl isobutyl ketone and 50 milliliters of dilute sodium hydroxide. The organic layer was dried over anhydrous sodium sulfate and 1.6 grams (0.011 mole) of methyl iodide was added. The resulting precipitate was recrystallized from ethanol. Yield, 3.4 grams (55%). Melting 218–219 degrees centigrade.

*Anal.*—Percent calc. for $C_{27}H_{37}IN_2O_2S$: N, 4.83. Percent found: N, 4.83.

EXAMPLE 8.—1-ISOPROPYL-3 - PYRROLIDYL 1-ISOPROPYL - 3,3 - DIPHENYL - 2 - PYRROLIDINONE-4-PROPIONATE

A solution of 10 grams (0.027 mole) of 3,3-diphenyl-1-isopropyl - 2 - pyrrolidinone - 4 - propionyl chloride and 4 grams (0.032 mole) of 1-isopropyl-3-pyrrolidinol in 150 milliliters of chloroform was refluxed two hours. The solution was allowed to stand overnight, washed with dilute hydrochloric acid, dilute sodium hydroxide and water, dried over anhydrous sodium sulfate and concentrated. The product was isolated as an oil by distillation at reduced pressure. It can also be isolated by formation of a salt by reaction with an appropriate acid such as maleic acid.

EXAMPLE 9.—DIMETHYLAMINOETHYL 1-METHYL-3,3-DIPHENYL-2-PYRROLIDINONE - 4 - PROPIONATE

In the manner given in Example 1, dimethylaminoethyl 1-methyl-3,3-diphenyl-2-pyrrolidinone-4-propionate is prepared from dimethylaminoethanol and 1-methyl-3,3-diphenyl-2-pyrrolidinone-4-propionyl chloride and isolated in the form of the free base or as a salt thereof.

EXAMPLE 10.—2 - DIMETHYLAMINO-1-METHYLETHYL 1 - CYCLOHEXYL-3,3-DIPHENYL-2-PYRROLIDINONE-4-PROPIONATE

In the manner given in Example 1, 2-dimethylamino-1-methylethyl 1-cyclohexyl-3,3-diphenyl-2-pyrrolidinone-4-propionate is prepared from 2-dimethylamino-1-methylethanol and 1-cyclohexyl-3,3-diphenyl-2-pyrrolidinone-4-propionyl chloride and isolated either in the from of the free base or as a salt thereof.

EXAMPLE 11.—PYRROLIDINOETHYL 1 - ETHYL-3,3 - DIPHENYL - 2 - PYRROLIDINONE-4-PYROPIONATE

In the manner given in Example 1, pyrrolidinoethyl 1-ethyl-3,3-diphenyl-2-pyrrolidinone - 4 - propionate is prepared from pyrrolidinoethanol and 1-ethyl-3,3-diphenyl-2-pyrrolidinone-4-propionyl chloride and isolated either in the form of the free base or as a salt thereof.

EXAMPLE 12.—1 - ISOPROPYL - 4 - PIPERIDYL 1-ETHYL - 3,3 - DIPHENYL-2-PYRROLIDINONE-4-PROPIONATE

In the manner of Example 1, 1-isopropyl-4-piperidyl 1-ethyl-3,3-diphenyl-2-pyrrolidinone - 4 - propionate is prepared from 1-isopropyl-4-piperidinol and 1-ethyl-3,3-diphenyl-2-pyrrolidinone-4-propionyl chloride and isolated either in the form of the free base or as a salt thereof.

EXAMPLE 13.—1-ETHYL-3-PIPERIDYL 1 - ISOPROPYL - 3,3-DIPHENYL-2-PYRROLIDINONE-4-PROPIONATE

In the manner given in Example 1, 1-ethyl-3-piperidyl 1 - isopropyl-3,3-diphenyl-2-pyrrolidinone-4-propionate is prepared from 1-ethyl-3-piperidinol and 1-isopropyl-3,3-dipheny-2-pyrrolidinone-4-propionyl chloride and isolated either in the form of the free base or as a salt thereof.

EXAMPLE 14.—1-METHYL - 3 - PYRROLIDYL 1-ETHYL - 3,3 - DIPHENYL-2-PYRROLIDINONE-4-PROPIONATE

In the manner given in Example 1, 1-methyl-3-pyrrolidyl 1-ethyl-3,3-diphenyl-2-pyrrolidinone-4-propionate is prepared from 1-methyl-3-pyrrolidinol and 1-ethyl-3,3-diphenyl-2-pyrrolidinone - 4 - propionyl chloride and isolated either in the form of the free base or as a salt thereof.

EXAMPLE 15.—(N' - METHYL - 1-PIPERAZINYL) PROPYL 1-ISOPROPYL-3,3-DIPHENYL - 2 - PYRROLIDINONE-4-PROPIONATE

In the manner given in Example 1, (N'-methyl-1-piperazinyl)-propyl 1-isopropyl-3,3-diphenyl-2-pyrrolidinone-4-propionate is prepared from (N'-methyl-1-piperazinyl)-1-propanol and 1-isopropyl-3,3-diphenyl-2-pyrrolidinone-4-propionyl chloride and isolated either in the form of the free base or as a salt thereof.

EXAMPLE 16.—DIMETHYLAMONETHYL 1-METHYL - 3,3 - DIPHENYL - 2 - PYRROLIDINONE - 4-BUTYRATE

In the manner given in Example 1, dimethylaminoethyl 1-methyl-3,3-diphenyl-2-pyrrolidinone-4-butyrate is prepared from dimethylaminoethanol and 1 - methyl - 3,3-diphenyl-2-pyrrolidinone-4-butyryl chloride and isolated either in the form of the free base or as a salt thereof.

In the same manner the following aminoalkyl esters are also prepared: diethylaminoethyl 1,3-dimethyl-3-phenyl-2-pyrrolidinone-4-propionate, diisopropylaminoethyl 1-benzyl-3,3-diphenyl-2-pyrrolidinone-4 - propionate, hexamethyleneiminoethyl 1-ethyl-3-phenyl-3-(2'- or 3'-thienyl)-2-pyrrolidinone-4-propionate, morpholinoethyl 1 - ethyl-3-phenyl-3-(2'- or 3'-thenyl)-2-pyrrolidinone-4-propionate, N'-phenyl-N-piperazinoethyl 1-methyl-3,3-diphenyl-2-pyrrolidinone-4-propionate, dimethylaminoethyl 1-isopropyl-3-cyclohexyl-3-phenyl - 2 - pyrrolidinone - 4 - propionate, dimethylaminoethyl 1-isopropyl-3-phenyl-3-(3'-pyridyl)-2-pyrrolidinone-4-propionate, dimethyl-aminoethyl 1,3-diisopropyl-3-phenyl-2-pyrrolidinone-4-propionate, dimethylaminoethyl 1 - isopropyl - 3 - (p- methoxyphenyl) - 3-phenyl - 2 - pyrrolidinone - 4 - propionate, dimethylaminoethyl 1-isopropyl-3-(m-chlorophenyl)-3-phenyl - 2-pyrrolidinone-4-propionate, dimethylaminoethyl 1-isopropyl-3-(o-methylphenyl)-3-phenyl-2-pyrrolidinone-4 - propionate, dimethylaminoethyl 1-isopropyl-3,3-diphenyl-2-pyrrolidinone-4-(alpha - methyl - propionate), dimethylaminoethyl 1-isopropyl-3,3-diphenyl-2 - pyrrolidinone - 4-(beta-methylpropionate), and dimethylaminoethyl 1-isopropyl-3,3-diphenyl-2-pyrrolidinone-4-butyrate are prepared respectively from the following acids, or their acid halides or other suitable derivative: 1,3-dimethyl-3-phenyl-2-pyrrolidinone-4-propionic acid, 1-benzyl-3,3-diphenyl-2-pyrrolidinone-4-propionic acid, 1 - ethyl - 3-phenyl-3-(2'- or 3'-thienyl)-2-pyrrolidinone-4-propionic acid, 1-ethyl-3-phenyl-3'-(2'- or 3'-thenyl)-2-pyrrolidinone-4-propionic acid, 1-methyl-3,3-diphenyl-2-pyrrolidinone-4-propionic acid, 1-isopropyl-3-cyclohexyl-3-phenyl-2-pyrrolidinone-4-propionic acid, 1 - isopropyl-3-phenyl-3 - (3'pyridyl) - 2 - pyrrolidinone - 4 - propionic acid, 1,3-diisopropyl-3-phenyl-2-pyrrolidinone-4-propionic acid, 1-isopropyl-3-(p-methoxyphenyl)-3-phenyl - 2 - pyrrolidinone-4-propionic acid, 1-isopropyl-3-(m-chlorophenyl)-3-phenyl-2-pyrrolidinone-4-propionic acid, 1-isopropyl-3-(o-methylphenyl)-3-phenyl-2-pyrrolidinone-4 - propionic acid, 1 - isopropyl-3,3-diphenyl-2-pyrrolidinone-4-(alpha-methylpropionic acid), 1-isopropyl-3,3-diphenyl-2-pyrrolidinone - 4 - (beta - methylpropionic acid), and 1-isopropyl - 3,3 - diphenyl - 2 - pyrrolidinone - 4 - butyric acid, and the appropriate amino alcohol or its appropriate derivative. The corresponding 2-thionpyrrolidinone-4-propionates and butyrates are prepared by employing the corresponding 2-thionpyrrolidinone - 4 - alkanoic acid in place of the starting 2-pyrrolidinone-4-alkanoic acid. In this manner, all of the compounds of the foregoing Formula I are prepared, as well as their acid addition and quaternary ammonium salts.

All of the compounds prepared in the foregoing examples exhibit analeptic activity. Some compounds demonstrate sufficient hypotensive activity to merit their use as hypotensives.

*Formulation and administration.*—Effective quantities of any of the foregoing pharmacologically active compounds may be administered to a living animal body in any one of various ways, for example, orally as in capsules or tablets, parenterally in the form of sterile solutions or suspensions, and in some cases intravenously in the form of sterile solutions. The free basic amino compounds, while effective, are preferably formulated and administered in the form of their non-toxic acid-addition or quaternary ammonium salts for purposes of convenience of crystallization, increased solubility, and the like. The amino-lower-alkyl-esters of 1-alkyl-3,3-disubstituted-4-(omega-carboxyalkyl)-2-pyrrolidinones and 2-thionpyrrolidinones, especially in the form of their acid-addition salts, represent a preferred group of highly active compounds, of which the 1-isopropyl compounds are outstandingly active. Preferred groups at the 3-position are phenyl radicals as the 3,3-diphenyl compounds are likewise outstanding in their activity.

Although very small quantities of the active materials of the present invention are effective when minor therapy is involved or in cases of administration to subjects having a relatively low body weight, unit dosages are usually five milligrams or above and preferably twenty-five, fifty or one hundred milligrams or even higher, depending of course upon the emergency of the situation and the particular result, e.g., analeptic or hypotensive, desired. Five to fifty milligrams appears optimum per unit dose, while usual broader ranges appear to be one to 100 milligrams per unit dose. The active agents of the invention may be combined with other pharmacologically active agents, or with buffers, antacids or the like, for administration and the proportion of the active agent in the compositions may be varied widely. It is only necessary that the active ingredient constitute an effective amount, i.e., such that a suitable effective dosage will be obtained consistent with the dosage form employed. Obviously, several unit dosage forms may be administered at about the same time. The exact individual dosages as well as daily dosages in a particular case will of course be determined according to established medical principles under the direction of a physician or veterinarian. Results upon administration of these novel materials have thus far proved extremely gratifying.

The formulations of Example 17 are representative for all of the pharmacologically active compounds of the invention, but have been especially designed to embody as active ingredient amino-lower-alkyl esters of 1-alkyl-3,3-diphenyl-(omega-carboxyalkyl) - 2 - pyrrolidinones and 2-thionpyrrolidinones, especially the diloweralkylaminoalkyl or heterocyclic aminoalkyl esters of the foregoing examples, or their hydrochlorides, hydrobromides, methiodides, or like pharmaceutically acceptable salts.

EXAMPLE 17.—FORMULATIONS

(1) *Capsules*

Capsules of 5 mg., 25 mg., and 50 mg. of active ingredient per capsule are prepared. With the higher amounts of active ingredient, reduction may be made in the amount of lactose.

Typical blend for encapsulation:

| | Per capsule, mg. |
|---|---|
| Active ingredient, as salt | 5.0 |
| Lactose | 296.7 |
| Starch | 129.0 |
| Magnesium stearate | 4.3 |
| Total | 435.0 |

Additional capsule formulations preferably contain a higher dosage of active ingredient and are as follows:

| Ingredients | 100 mg. per capsule | 250 mg. per capsule | 500 mg. per capsule |
|---|---|---|---|
| Active ingredient, as salt | 100.0 | 250.0 | 500.0 |
| Lactose | 231.5 | 126.5 | 31.1 |
| Starch | 99.2 | 54.2 | 13.4 |
| Magnesium stearate | 4.3 | 4.3 | 5.5 |
| Total, mg | 435.0 | 435.0 | 550.0 |

In each case, uniformly blend the selected active ingredient with lactose, starch, and magnesium stearate and encapsulate the blend.

(2) Tablets

A typical formulation for a tablet containing 5.0 mg. of active ingredient per tablet follows. The formulation may be used for other strengths of active ingredient by adjustment of weight of dicalcium phosphate.

| | Per tablet, mg. |
|---|---|
| (1) Active ingredient | 5.0 |
| (2) Corn starch | 13.6 |
| (3) Corn starch (paste) | 3.4 |
| (4) Lactose | 79.2 |
| (5) Dicalcium phosphate | 68.0 |
| (6) Calcium stearate | 0.9 |
| Total | 170.1 |

Uniformly blend 1, 2, 4 and 5. Prepare 3 as a 10 percent paste in water. Granulate the blend with starch paste and pass the wet mass through an eight mesh screen. The wet granulation is dried and sized through a twelve mesh screen. The dried granules are blended with the calcium stearate and compressed.

Additional tablet formulations preferably contain a higher dosage of the active ingredient and are as follows:

(A) 50 MG. TABLET

Ingredients:

| | Per tablet, mg. |
|---|---|
| Active ingredient, as salt | 50.0 |
| Lactose | 90.0 |
| Milo starch | 20.0 |
| Corn starch | 38.0 |
| Calcium stearate | 2.0 |
| Total | 200.0 |

Uniformly blend the active ingredient, lactose, milo starch and corn starch. This blend is granulated using water as a granulating medium. The wet granules are passed through an eight mesh screen and dried at 140 to 160 degrees Fahrenheit overnight. The dried granules are passed through a number ten mesh screen and blended with the proper amount of calcium stearate and this blend is then converted into tablets on a suitable tablet press.

(B) 100 MG. TABLET

Ingredients:

| | Per tablet, mg. |
|---|---|
| Active ingredient, as salt | 100.0 |
| Lactose | 190.0 |
| Dicalcium phosphate | 172.2 |
| Starch | 54.0 |
| Milo starch | 21.6 |
| Calcium stearate | 2.2 |
| Total | 540.0 |

Uniformly blend the active ingredient, lactose, dicalcium phosphate, starch and milo starch. This blend is granulated with water and the wet mass is passed through a number eight mesh screen. The wet granules are dried at 140–160 degrees Fahrenheit overnight. The dried granules are passed through a number ten mesh screen. These dried granules are blended with the proper weight of calcium stearate and the lubricated granules are then converted into tablets on a suitable tablet press.

(C) 250 MG. TABLET

Ingredients:

| | Per tablet, mg. |
|---|---|
| Active ingredient, as salt | 250.0 |
| Corn starch | 56.0 |
| Carbowax 6000 (polyethylene glycol of M.W. approximately 6000) | 25.0 |
| Lactose | 35.0 |
| Magnesium stearate | 4.0 |
| Total | 370.0 |

Uniformly blend the active ingredient, corn starch, Carbowax 6000, lactose, and one-half the weight of magnesium stearate required. This blend is then "slugged" on a suitable tablet press. These "slugs" are granulated through a ten mesh screen on an oscillating granulator. These granules are then blended with the remainder of the magnesium stearate and the lubricated granules are then converted into tablets on a suitable tablet press.

(D) 500 MG. TABLET

Ingredients:

| | Per tablet, mg. |
|---|---|
| Active ingredient, as salt | 500.0 |
| Corn starch (wet) | 86.4 |
| Milo starch | 32.4 |
| Calcium stearate | 3.2 |
| Corn starch (dry) | 26.0 |
| Total | 648.0 |

Uniformly blend the active ingredient, corn starch and milo starch. This blend is wet granulated using water and the wet mass is passed through a number eight mesh screen. These wet granules are dried overnight at 140–160 degrees Fahrenheit. The dried granules are passed through a number ten mesh screen. The dried granules and weighed amounts of corn starch and calcium stearate are uniformly blended and these lubricated granules are compressed on a suitable tablet press.

(3) Injectable-2% sterile solution

| | Per cc. |
|---|---|
| Active ingredient | 20 mg. |
| Preservative, e.g., chrorobutanol | 0.5% weight/volume. |
| Water for injection, q.s. | |

Prepare solution, clarify by filtration, fill into vials, seal, and autoclave.

(4) The pharmacologically active compounds provided by the present invention may also be administered successfully by embodying an effective quantity thereof in an injectable suspension for injection into an animal body, in oral powders, suspensions or syrups, and in other acceptable dosage forms.

Various modifications and equivalents will be apparent to one skilled in the art and may be made in the compounds, compositions, and methods of the present invention without departing from the spirit or scope thereof, and it is therefore to be understood that the invention is to be limited only by the scope of the appended claims.

We claim:

1. A compound selected from the group consisting of (a) heterocyclic esters having the formula:

$$\begin{array}{c} A \\ | \\ R-C\underset{X=C}{\overset{}{\underset{|}{\longrightarrow}}}CH-(CHR'')_n-CHR''-CHR''-\overset{O}{\overset{\|}{C}}-O-Y-B \\ \diagdown \phantom{xx} \diagup \\ N \\ | \\ R' \end{array} \qquad (I)$$

wherein
A is monocarbocyclic aryl having six ring carbon atoms,
X is selected from the group consisting of oxygen and sulfur,
R is selected from the group consisting of monocarbocyclic aryl having six ring carbon atoms, monocarbocyclic aralkyl having six ring carbon atoms, lower-alkyl, cycloalkyl having up to a maximum of nine carbon atoms, pyridyl, thienyl, and thenyl,
R′ is selected from the group consisting of lower-alkyl, lower-alkenyl, cycloalkyl having up to a maximum of nine carbon atoms, cycloalkenyl having up to a maximum of nine carbon atoms, and monocarbocyclic aralkyl having six ring carbon atoms,
R″ is selected from the group consisting of hydrogen and methyl, a maximum of two R″ being other than hydrogen,
wherein monocarbocyclic aryl and monocarbocyclic aralkyl have at most fifteen carbon atoms and wherein the aryl group in each such monocarbocyclic radical is substituted by a member selected from the group consisting of hydrogen, nitro, lower-alkoxy, lower - alkylmercapto, lower - alkyl, dilower-alkylamino, trifluoromethyl, and halogen, and wherein "alkyl" in "aralkyl" is lower-alkyl,
$n$ is selected from zero and one,
Y is a lower-alkylene radical having a maximum of eight carbon atoms,
B is an amino radical selected from the group consisting of amino ($-NH_2$); lower-alkyl-amino; di-lower-alkyl-amino; lower-alkenyl-amino; di-lower-alkenyl-amino; phenylamino; (hydroxy-lower-alkyl)-amino; di-(hydroxy-lower-alkyl)-amino; lower-alkyl- (hydroxy-lower-alkyl)-amine; basic saturated monocyclic heterocyclic radicals of less than twelve carbon atoms selected from the group consisting of piperidino, lower - alkyl-piperidino; di-lower-alkyl-piperidino; lower-alkoxy-piperidino; pyrrolidino; lower-alkyl-pyrrolidino; di-lower-alkyl-pyrrolidino; lower-alkoxy-pyrrolidino; morpholino; lower-alkyl-mopholino; di-lower-alkyl morpholino; lower-alkoxymorpholino; thiomorpholino; lower - alkyl-thiomorpholino; di-lower - alkyl-thiomorpholino; lower-alkoxy-thiomorpholino; piperazino; lower-alkyl-piperazino; di-C-(lower-alkyl)-piperazino; N⁴-(lower-alkyl)-C-(lower-alkyl) - piperazino; N-(hydroxy-lower-alkyl)-piperazino; N - (lower-alkanoyloxy lower-alkyl)-piperazino; lower - alkoxy-piperazinio; N′-lower-alkoxy-lower-alkylpiperazino; and lower carbalkoxy-piperazino, and wherein Y and B taken together additionally are selected from the group consisting of N - (lower-alkyl-3-pyrrolidyl, N - (lower-alkyl-3-piperidyl, and N - (lower-alkyl)-4-piperidyl, and C-lower-alkyl derivatives of the last three named groups, and (b) quaternary ammonium salts thereof and (c) acid addition salts thereof.

2. An aminolower-alkyl 1-lower-alkyl-3,3-diphenyl-2-pyrrolidinone-4-propionate, wherein the amino radical of the aminolower-alkyl group is a saturated monocyclic heterocyclic radical of less than twelve carbon atoms having up to a maximum of two hetero atoms in the heterocyclic ring.

3. A non-toxic acid-additon salt of an aminoloweralkyl 1 - lower-alkyl-3,3-diphenyl-2-pyrrolidinone-4-propionate of claim 2.

4. A non-toxic acid addition salt of dilower-alkylaminolower-alkyl 1-lower-alkyl-3,3-diphenyl-2-pyrrolidinone-4-propionate.

5. A dilower-alkylaminolower-alkyl 1-lower-alkyl-3,3-diphenyl-2-pyrrolidinone-4-propionate.

6. Dimethylaminoethyl 1-isopropyl-3,3-diphenyl-2-pyrrolidinone-4-propionate.

7. A non-toxic acid-addition salt of dimethylaminoethyl 1-isopropyl-3,3-diphenyl-2-pyrrolidinone-4-propionate.

8. Dimethylaminoethyl 1-isopropyl-3,3-diphenyl-2-pyrrolidinone-4-propionate hydrochloride.

9. A non-toxic acid-addition salt of 4-piperidinobutyl 1-isopropyl-3,3-diphenyl-2-pyrrolidinone-4-propionate.

References Cited by the Examiner
UNITED STATES PATENTS

| | | | |
|---|---|---|---|
| 1,915,334 | 6/33 | Salzberg et al. | 260—243 |
| 2,075,359 | 3/37 | Salzberg et al. | 167—22 |
| 2,425,320 | 8/47 | Hill | 252—149 |
| 2,606,155 | 8/52 | Hill | 252—149 |
| 2,884,426 | 4/59 | Kottler et al. | 260—326.3 |
| 2,885,404 | 5/59 | Petrow et al. | 260—294.3 |
| 2,891,071 | 6/59 | Aspergren et al. | 260—326.3 |
| 2,997,422 | 8/61 | Tedeschi | 167—65 |
| 3,011,945 | 12/61 | Bolling et al. | 167—65 |

NICHOLAS S. RIZZO, *Primary Examiner.*

WALTER A. MODANCE, *Examiner.*

UNITED STATES PATENT OFFICE
CERTIFICATE OF CORRECTION

Patent No. 3,192,207                        June 29, 1965

Carl D. Lunsford et al.

It is hereby certified that error appears in the above numbered patent requiring correction and that the said Letters Patent should read as corrected below.

Column 1, lines 21 to 27, for that portion of the formula reading column 4, line 6, for "lisopropyl-" read -- 1-isopropyl- --; column 5, line 75, for "rection" read -- reaction --; column 11, Table I, footnote b, for "chloro-′2" read -- chloro-2′ --; column 16, line 28, for "(0.027) mole)" read -- (0.027 mole) --; line 56, for "from" read -- form --; line 59, for "4-PYRO-" read -- 4-PRO- --; line 72, strike out "pre-"; column 17, line 7, for "dipheny-" read -- diphenyl- --; column 21, line 34, for "amine" read -- amino --; column 22, line 5, for "-alkyl-", each occurrence, read -- -alkyl)- --.

Signed and sealed this 26th day of April 1966.

(SEAL)
Attest:

ERNEST W. SWIDER                     EDWARD J. BRENNER
Attesting Officer                  Commissioner of Patents